(12) United States Patent
Heller et al.

(10) Patent No.: US 9,701,057 B2
(45) Date of Patent: Jul. 11, 2017

(54) SINGULATION APPARATUS FOR PREFORMS, COMPRISING A DEVICE FOR ELIMINATING MISPOSITIONED PREFORMS

(71) Applicant: KHS CORPOPLAST GMBH, Hamburg (DE)

(72) Inventors: Alexander Heller, Bargteheide (DE); Dieter Holler, Rümpel (DE)

(73) Assignee: KHS CORPOPLAST GMBH, Hamburg (DE)

( * ) Notice: Subject to any disclaimer, the term of this patent is extended or adjusted under 35 U.S.C. 154(b) by 383 days.

(21) Appl. No.: 14/406,477

(22) PCT Filed: Jun. 15, 2013

(86) PCT No.: PCT/EP2013/001775
§ 371 (c)(1),
(2) Date: Dec. 8, 2014

(87) PCT Pub. No.: WO2013/185930
PCT Pub. Date: Dec. 19, 2013

(65) Prior Publication Data
US 2015/0151478 A1    Jun. 4, 2015

(30) Foreign Application Priority Data
Jun. 15, 2012 (DE) .................. 10 2012 011 762

(51) Int. Cl.
*B29C 49/42* (2006.01)

(52) U.S. Cl.
CPC .. *B29C 49/4205* (2013.01); *B29C 2049/4231* (2013.01)

(58) Field of Classification Search
CPC ........ B29C 49/4205; B29C 2049/4231; B65G 47/22; B65G 47/256
See application file for complete search history.

(56) References Cited

U.S. PATENT DOCUMENTS

| 4,076,071 A | 2/1978 | Rosenkranz |
|---|---|---|
| 5,346,386 A | 9/1994 | Albrecht et al. |

(Continued)

FOREIGN PATENT DOCUMENTS

| CA | 2031731 A1 | 6/1991 |
|---|---|---|
| CH | 702406 A1 | 6/2011 |

(Continued)

*Primary Examiner* — Alison L Hindenlang
(74) *Attorney, Agent, or Firm* — Lucas & Mercanti, LLP; Klaus P. Stoffel

(57) ABSTRACT

A singulation apparatus for preforms, including a device for eliminating mispositioned preforms. The singulation apparatus is designed as a roll-type sorting apparatus that has two conveyor rolls which rotate about parallel axes of rotation, define a common conveying plane, and convey the preforms between the conveying rolls in a direction of travel. The device for eliminating mispositioned preforms is a kick wheel that rotates about an axis of rotation, has a lateral direction of ejection, and meshes with an elimination region above correctly positioned preforms. The kick wheel is concentric with the conveyor rolls and is arranged at a vertical distance above the conveying plane, the axis of rotation of the kick wheel extending substantially in the vertical direction and being inclined by an angle >0° relative to the position extending perpendicular to the conveying plane

6 Claims, 3 Drawing Sheets

(56) References Cited

U.S. PATENT DOCUMENTS

| | | | |
|---|---|---|---|
| 5,648,026 A | 7/1997 | Weiss | |
| 6,575,305 B1 * | 6/2003 | Casagrande | ........ B29C 49/4205 198/455 |
| 6,968,936 B2 | 11/2005 | Charpentier | |
| 8,813,944 B2 | 8/2014 | Tanner | |
| 2008/0226763 A1 | 9/2008 | Charpentier | |
| 2010/0255142 A1 * | 10/2010 | Brown | ................ B29C 49/4205 425/534 |

FOREIGN PATENT DOCUMENTS

| | | |
|---|---|---|
| DE | 2352926 A1 | 4/1975 |
| DE | 4212583 A1 | 10/1993 |
| DE | 4340291 A1 | 6/1995 |
| DE | 69016963 T2 | 9/1995 |
| DE | 60118772 T2 | 5/2007 |
| EP | 1335870 B1 | 4/2006 |
| EP | 1697237 b1 | 4/2007 |
| FR | 2899882 A1 | 10/2007 |
| WO | 2011069268 A1 | 6/2011 |

\* cited by examiner

SINGULATION APPARATUS FOR PREFORMS, COMPRISING A DEVICE FOR ELIMINATING MISPOSITIONED PREFORMS The present application is a 371 of International application PCT/EP2013/001775, filed Jun. 15, 2013, which claims priority of DE 10 2012 011 762.0, filed Jun. 15, 2012, the priority of these applications is hereby claimed and these applications ate incorporated herein by reference.

BACKGROUND OF THE INVENTION

The present invention pertains to a singulation apparatus for preforms with a device for eliminating mispositioned preforms. Such singulation apparatuses are required in the technical area of the conveyance of preforms to a machine for the production of containers from a thermoplastic material, wherein the containers are formed by the action of blowing pressure.

In the process of forming containers by the action of blowing pressure, preforms of a thermoplastic material such as preforms of PET (polyethylene terephthalate) are sent to various processing stations within a blow-molding machine. A blow-molding machine of this type typically comprises a heating device and a blowing device, in the area of which the previously tempered preform is expanded into a container by biaxial orientation. The expansion occurs by means of compressed air, which is introduced into the preform to be expanded. The course of the processing technology involved in a preform expansion of this type is explained in DE-OS 43 40 291. The basic configuration of a blow-molding station for forming containers is described in DE-OS 42 12 583. Possibilities for tempering the preforms are explained in DE-OS 23 52 926. Reference is made to the content of these documents.

The blow-molding machine must be supplied continuously with preforms so that the feed to the blow-molding machine will not be interrupted. This is true both for linear blow-molding machines and for those based on the rotary wheel principle. There are two alternative ways in which the preforms can be sent to the blow-molding machine. In the case of the so-called "one-step" method, the preforms are produced by an injection-molding process, and, immediately after they have been injection-molded (and after they have solidified sufficiently), they are transported directly to the blow-molding machine by a conveying apparatus. In the case of the so-called "two-step" method, the preforms are first produced by an injection-molding process and then stored; they are conditioned with respect to their temperature and then blown into containers only at a later time. The production of the preforms and the blow-molding of the preforms into containers can take place at different times and at different places.

Both methods have in common that the preforms are sent to the blow-molding machine by a conveying apparatus. Known apparatuses consist of, for example, a vertical conveyor, by which the preforms, which are stored in a collecting bin, are transported to a conveying device. By means of the conveying device, usually a conveyor belt, the preforms are transported to a singulation apparatus. This singulation apparatus has the task of orienting the preforms so that assume a defined position and of singulating them so that they can be transferred properly to, for example, a downstream blow-molding machine. Known singulation apparatuses (so-called "roll sorters") consist of, for example, two conveying rolls, which rotate around their axes in opposite directions and between which a narrow gap remains, which is selected so that the preforms can be held, suspended by their collars, between the rotating conveying rolls. The rotational axes of the conveying rolls are arranged parallel to each other, so that the two axes define a plane. The conveying rolls are arranged with a gradient, that is, at a certain angle to the horizontal, so that the preforms slide along the conveying rolls in the direction of the gradient. In this way, the preforms are sorted in suspended fashion, singulated between the rotating rolls, and also conveyed as a result of the gradient. The conveyance of the preforms in the singulation apparatus occurs in a conveying plane, which is parallel to the plane defined by the two rotational axes of the conveying rolls, so that the conveying plane also comprises the above-mentioned angle to the horizontal.

It is known that preforms which have not been properly sorted and therefore project above a predefined height, for example, can be sorted out. Such sorting-out devices are known from, for example, WO 2011/069268 A1. There the sorting-out is realized by the action of a blast of air. In this document, additional sorting-out devices according to the prior art are also discussed.

It is also known that rotating wheels can be used to accomplish the sorting-out task; these are also called "kicker wheels". Kicker wheels are known which are arranged to work in a backflow manner. The rotational axis of such wheels is parallel to, and a certain distance above, the plane defined by the two rotational axes of the conveying rolls of the roll sorter. The rotational direction is selected so that the rotating paddles of the wheel move in the direction opposite to that in which the preforms are being conveyed. A preform which projects above the predefined height is gripped by a paddle of the paddle wheel, pulled out in the direction opposite the conveying direction and opposite the oncoming preforms, and ejected. It is considered a disadvantage that this results in the creation of large gaps in the flow of performs.

An alternative configuration is described in DE 601 18 772 T2, which shows a kicker wheel arranged above the conveying rolls of a roll sorter. In a first example, the rotational axis of the kicker wheel is parallel to, and a certain distance above, the plane defined by the two rotational axes of the conveying rolls of the roll sorter, wherein the rotational axis is at an angle to its conveying direction. When a preform is gripped, the angled position has the effect of ejecting the preform both to the side and in the backflow direction simultaneously. It is still considered a disadvantage, however, that in this way gaps are formed in the flow of preforms.

In the second example described in DE 601 18 772 T2, the rotational axis of the kicker wheel is parallel to, and a certain distance above, the plane defined by the two rotational axes of the conveying rolls of the roll sorter, wherein the rotational axis is now parallel to the conveying direction. When a preform is gripped, only a sideways-acting ejection force is applied. In this configuration, it is considered disadvantageous that the paddles of the kicker wheel can dip to only a small degree between the conveying rolls and that it is impossible to adjust the height of the wheel.

SUMMARY OF THE INVENTION

The goal of the present invention is to make available an improved singulation apparatus for preforms with a device for sorting out mispositioned preforms, namely, an apparatus which is adapted in particular to the high throughputs required for supplying a high-performance blow-molding machine with preforms.

The singulation apparatus according to the invention is characterized by a laterally-ejecting kicker wheel, which combs a sorting-out zone above correctly positioned preforms, wherein the rotational axis of the kicker wheel is arranged centrally with respect to the conveying rolls and a certain distance above the conveying plane, wherein the rotational axis of the kicker wheel extends essentially in the vertical direction and is tilted out of the position perpendicular to the conveying plane by an angle of >0°.

The tilt angle can be less than 20°, for example, especially less than 10°. As a result of this moderate tilt and the central arrangement, the kicker wheel can dip between the conveying rolls.

It is advantageous to provide means for adjusting the height of the kicker wheel, so that, as a function of the type preform, for example, the dipping depth can be adapted. It is especially preferred in this case for the tilt angle to be variable and for the height adjustment to be achieved as a result of the tilt adjustment. The adjustability can be configured to be automatic, for example. Actuators driven by the control unit of the system can be provided for this purpose.

The sorting-out can be improved by the use of "blow-out" nozzles to support the sorting-out of an incorrectly positioned preform. The blow-out nozzles are preferably controlled by a light barrier.

The invention is explained in greater detail below on the basis of several exemplary embodiments, which are illustrated in the figures:

DETAILED DESCRIPTION OF THE INVENTION

Figure 1:
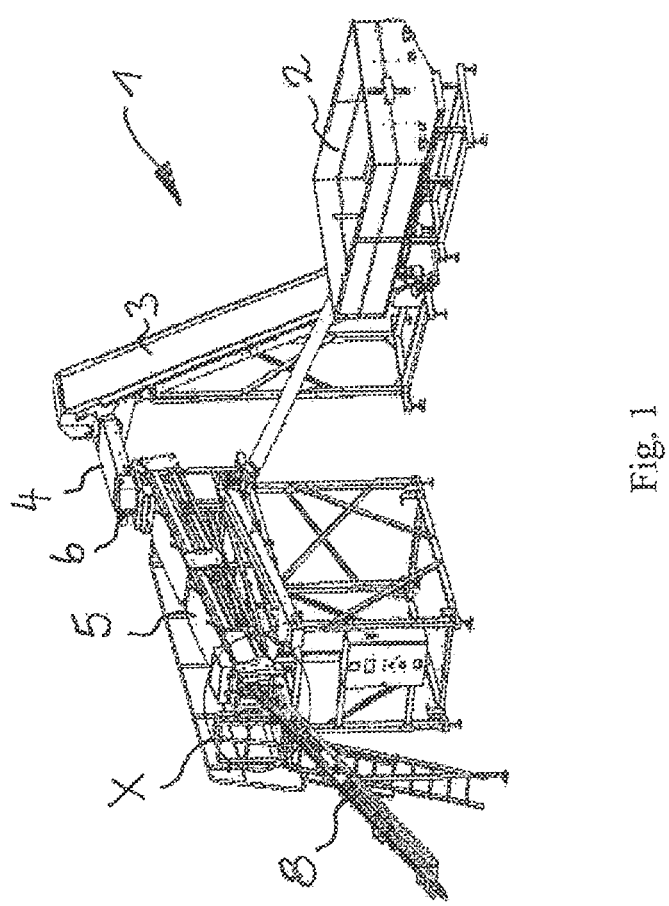
FIG. 1 shows an apparatus for conveying preforms to a blow-molding machine for the production of containers from a thermoplastic material.

FIG. 1 shows an apparatus 1 for conveying preforms to, for example, a blow-molding machine for the production of PET bottles. The apparatus consists of a collecting bin 2, in which a supply of preforms is provided. From the collecting bin 2, the preforms are conveyed by a vertical conveyor 3 to the inlet end of a conveying device 4. The other end of the conveying device 4, i.e., the discharge end, is arranged above a singulation apparatus 5, wherein a feed device 6 is provided in between to ensure the orderly transfer of the preforms from the conveying device 4 to the singulation apparatus 5 with a minimum of disruption. From the singulation apparatus 5, the preforms arrive, sorted, at a gravity conveying device 8, via which the preforms are conveyed into the blow-molding machine (not shown). The singulation apparatus is configured in the present case as a roll sorter.

Figure 2A:
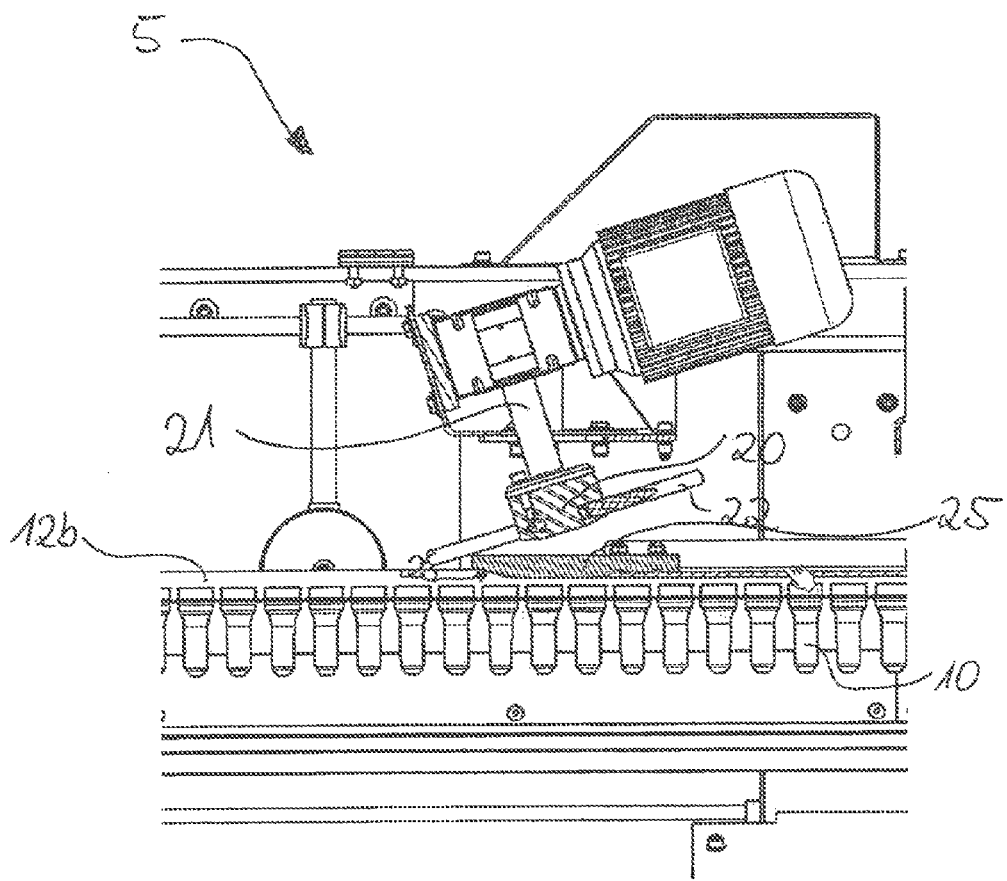
FIGS. 2a, 2b show cross-sectional views of the detail marked "X" in FIG. 1.
Figure 2B:
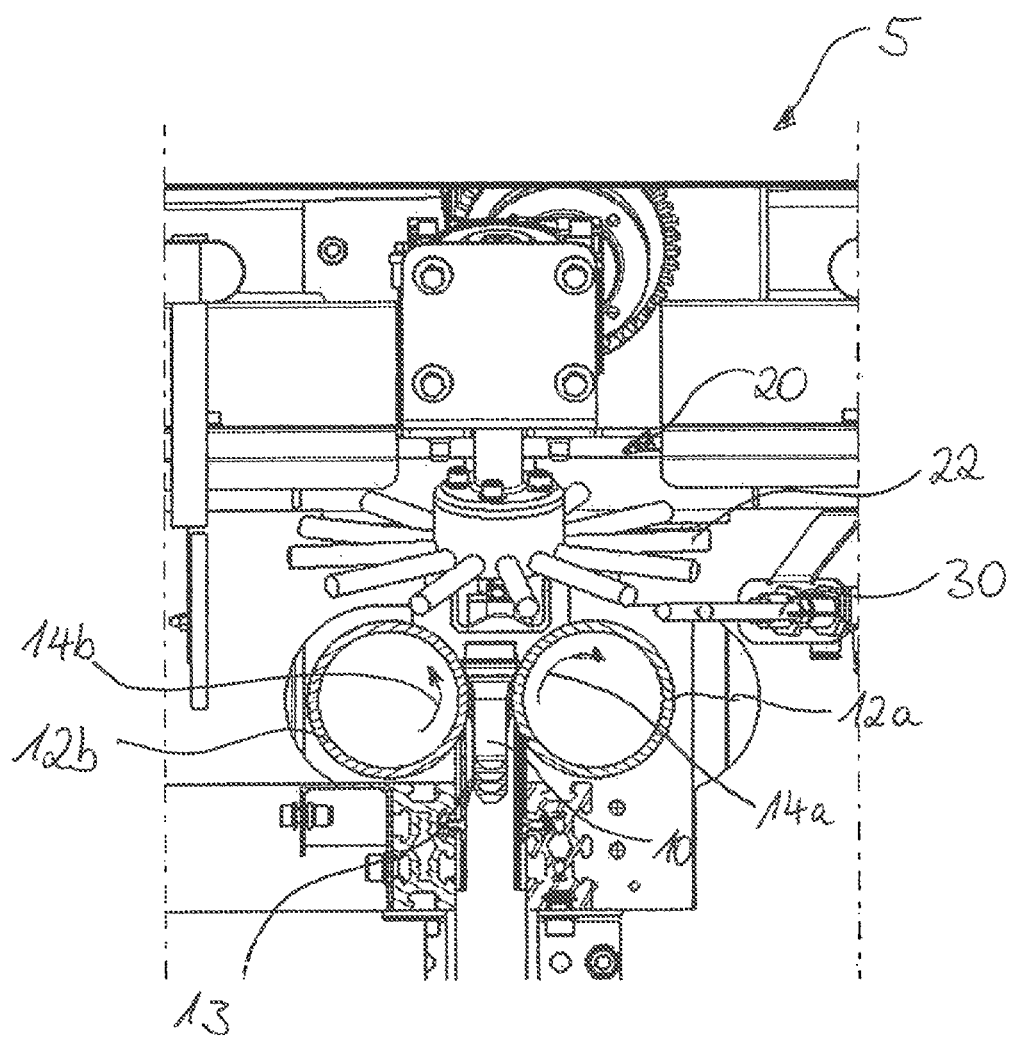

FIG. 2a shows a cross-sectional side view of the detail marked "X" in FIG. 1, whereas FIG. 2b show a cross-sectional view perpendicular to that, looking in the conveying direction. In FIG. 2a, the flow direction of the preforms 10 is from left to right; in FIG. 2b, it proceeds into the plane of the drawing. In regard to FIG. 2a, it should be kept in mind that the forward conveying roll 12a has been left out for the sake of clarity, and that only the rear conveying roll 12b can be seen, behind the preforms 10.

The two conveying rolls 12a, 12b of the roll conveyor are parallel to each other and define a plane extending essentially in a horizontal direction. Between these rolls 12a, 12b there is a gap 13, which is wide enough to allow the closed part of the preform to pass through but not the open mouth area provided with a circumferential rim. The rim is also called the "collar". This collar rests on the two conveying rolls 12a, 12b and slides along the two of them in the conveying direction. The two conveying rolls 12a, 12b are driven in opposite rotational directions, as indicated by the arrows 14a, 14b. As a rule, a gradient is provided, that is, the rotational axes of the conveying rolls are tilted by a certain angle to the horizontal; in corresponding fashion, the conveying plane then also has this angle of inclination to the horizontal. The singulated and aligned preforms 10 leave the singulation apparatus 5 toward the right in FIG. 2a, so that they can then be subjected to further processing in, for example, a blow-molding machine.

FIGS. 2a and 2b show only the rear area of the singulation apparatus 5 as seen in the conveying direction. The apparatus is no longer being supplied with disordered preforms; instead, the preforms 10 have already assumed a rest position.

In contrast to what is shown in FIG. 2a, incorrectly positioned preforms are also often present in the flow of preforms; these must be sorted out before they can lead to jams, which interrupt the supply of preforms to the downstream machines. The singulation apparatus 5 shown here comprises a kicker wheel 20 for this sorting-out process, which will be discussed in greater detail below.

It can be seen especially in the side view of FIG. 2a that the rotational axis 21 of the kicker wheel 20 is tilted out of a vertical position. In the case of conveying rolls arranged with a gradient, the rotational axis 21 of the kicker wheel 20 will be tilted out of the position perpendicular to the conveying plane. For this reason, the paddles 22 of the kicker wheel 20, which are formed as round cords of an elastic material, for example, do not pass along a horizontal plane, as known from the prior art; on the contrary, the plane in which they pass extends at an angle to the horizontal. In the cross-sectional view of FIG. 2b, it can be seen that the kicker wheel 20, i.e., the rotational axis of the kicker wheel 20, is centered between the two conveying rolls 12a, 12b and is arranged above the two conveying rolls 12a, 12b, so that the paddles 22 comb the area between the two conveying rolls 12a, 12b. The paddles 22 rotate so quickly that they pass over each preform 10 reliably at least once.

Because of the tilted orientation of the kicker wheel 20, i.e., of the rotational axis of the kicker wheel 20, the combing area can be set close to the area where the preforms are guided under the cover plate 25. There is considerable danger of a pile-up especially in front of the entrance bevel 26 of the cover plate 25.

The sorting-out process can be improved even more by providing a blow-out nozzle arrangement 30 to one side of the preform flow; this arrangement is supplied with compressed air and as needed directs a blast of air at the preforms 10 to be sorted out to accelerate the ejection process. To trigger the air blast, a light barrier, for example (not shown), can be arranged in such a way that a preform 10 which is projecting too far breaks the beam of the light barrier as soon as it enters the combing area. The air blow-out nozzle arrangement 30 is oriented so that the air blast is delivered toward the combing area and directs an ejection pulse transversely to the conveying direction at the preform which is projecting up too far.

The invention claimed is:

1. A singulation apparatus for preforms, wherein the singuiation apparatus comprises:
   a roll sorter with two conveying rolls rotating around parallel rotational axes, which rolls define a common conveying pane and convey the preforms between them in a conveying direction; and,
   a kicker wheel with a lateral ejection direction as a device for eliminating mispositioned preforms, the kicker wheel rotates around a rotational axis and combs a sorting-out zone above correctly positioned preforms, wherein the kicker wheel is arranged centrally with respect to the conveying rolls and at a level above the conveying plane, wherein the rotational axis of the kicker wheel extends substantially in a vertical direction and is tilted out of as position perpendicular to the conveying plane by a tilt angle of >0°.

2. The singulation apparatus according to claim 1, wherein the rotational axis is tilted out of a vertical position in the conveying direction.

3. The singulation apparatus according to claim 1, wherein the kicker wheel is configured to be height-adjustable.

4. The singulation apparatus according to claim 3, wherein the tilt angle is variable to adjust the height.

5. The singulation apparatus according to claim 1, further comprising an air blow-out nozzle arranged to one side of the conveying rolls, the blow-out nozzle being directed toward the sorting-out zone over which the kicker wheel passes and being configured to act on the preforms to be sorted out.

6. The singulation apparatus according to claim 5, wherein the air blow-out nozzle is controlled by a light barrier.

* * * * *